(12) United States Patent
Karte et al.

(10) Patent No.: US 7,862,003 B2
(45) Date of Patent: Jan. 4, 2011

(54) POSITION CONTROLLER

(75) Inventors: Thomas Karte, Bruchkoebel (DE); Joerg Kiesbauer, Eppertshausen (DE)

(73) Assignee: Samson AG, Frankfurt Am Main (DE)

( * ) Notice: Subject to any disclaimer, the term of this patent is extended or adjusted under 35 U.S.C. 154(b) by 832 days.

(21) Appl. No.: 11/435,926

(22) Filed: May 17, 2006

(65) Prior Publication Data

US 2006/0266966 A1    Nov. 30, 2006

(30) Foreign Application Priority Data

May 30, 2005    (DE) .................. 10 2005 024 686

(51) Int. Cl.
*F16K 31/02*    (2006.01)
(52) U.S. Cl. .................. 251/129.04; 324/207.16; 702/114
(58) Field of Classification Search .............. 700/1; 251/129.04; 60/407; 702/108, 113, 114; 73/168; 324/207.16
See application file for complete search history.

(56) References Cited

U.S. PATENT DOCUMENTS

| | | | | |
|---|---|---|---|---|
| 4,579,137 | A * | 4/1986 | Brandt, Jr. .................. 137/85 |
| 5,538,036 | A * | 7/1996 | Bergamini et al. .......... 137/552 |
| 5,651,385 | A * | 7/1997 | Karte .......................... 137/83 |
| 6,519,508 | B1 * | 2/2003 | Saito .......................... 700/282 |
| 6,745,084 | B2 * | 6/2004 | Boger et al. ................. 700/13 |
| 6,862,547 | B2 * | 3/2005 | Snowbarger et al. ........ 702/114 |
| 7,079,021 | B2 * | 7/2006 | Snowbarger et al. ........ 340/514 |
| 2005/0030186 | A1 * | 2/2005 | Huisenga et al. ............ 340/635 |

FOREIGN PATENT DOCUMENTS

| | | |
|---|---|---|
| DE | 4429401 C2 | 2/1996 |
| EP | 1 161 636 B1 | 12/2001 |
| WO | WO-99/21066 | 4/1999 |

OTHER PUBLICATIONS

ISR PCT/FI98/00784, Mar. 29, 1999, Neles Controls.

* cited by examiner

*Primary Examiner*—John Bastianelli
(74) *Attorney, Agent, or Firm*—Woodling, Krost and Rust

(57) ABSTRACT

Both improved protection against explosions and the possibility of performing diagnoses even when the I/P converter has been disconnected are to be provided by a position controller (5) for a pressure medium-operated actuating system, the controller being designed to be connected by a pneumatic line to a pneumatic drive (4)-equipped actuator (1) of an actuating element, especially an actuating element of a safety valve (2), where the actuator (1) has an electric power line (6) for controlling an I/P converter (7) according to the live-zero principle, and where the I/P converter (7) can be driven by an electrically controlled switch (10). The goal is achieved in that the switch (10) is designed to be driven by an additional circuit (11), which is connected to the power line (6) and installed in the position controller and which monitors the current in the power line (6).

26 Claims, 1 Drawing Sheet

POSITION CONTROLLER

FIELD OF THE INVENTION

The invention pertains to a position controller and to a process for actuating the position controller.

BACKGROUND OF THE INVENTION

Safety valves are used in safety-oriented fields, especially in the chemical industry and in power plants. They are used in emergencies and must always operate reliably. An actuator, which comprises a pneumatic actuating drive and a drive rod, causes the safety valve to perform translational or rotational movement.

It is known that the actuator can be tested by a diagnostic device. In such cases, a closing function and an opening function, for example, are checked. For example, a distance-time diagram of the actuation performed by the actuator, an end position, or some other variable can be recorded. The actuator is connected to a position controller, which is mounted on the actuator. The position controller acquires data which can serve diagnostic purposes.

The position controller is supplied by, for example, a 24-V power line. For safety reasons, a valve closing function is achieved by turning off the voltage supply completely. It is disadvantageous in this case that, because of the absence of an operating voltage, it is impossible to obtain any diagnostic data for a microprocessor.

Although it is possible to use batteries or additional power lines, this is not desirable in areas where there is the danger of explosion.

The so-called "live zero" method is known. Here, an opening function and a closing function of the valve are achieved by the use of two different current levels, namely, one of 4 mA and a second of 20 mA. A closing function is realized at 4 mA, and an opening function is realized at 20 mA. The weak 4-mA current, however, is also used to continue to supply a microprocessor with energy, so that, even if the power is turned off, diagnostic data can still be obtained.

A position controller for an actuator of a safety valve is known from WO 99/21066; this controller has a diagnostic unit. The diagnostic unit is intended to make it possible to verify fault-free operation. The position controller comprises a control unit, connected to the actuator; a microprocessor unit connected to the control unit; and a communications interface connected to the microprocessor for communicating with a display unit. The position controller is supplied with 24 V. When the voltage falls to zero, the actuator is actuated by the force of a spring, i.e., moved into a safety position. The actuator is activated by the release of the pressure. The microprocessor unit conducts diagnoses at certain intervals. During normal operation, the microprocessor conducts these diagnostic tests of the actuator at certain intervals. When an emergency function is initiated, a signal is sent directly from a separate safety system. The controller also includes a nozzle/baffle system for the emergency closing function and a separate nozzle/baffle system for the diagnostic function. This design suffers from the disadvantage that a defect in the nozzle/baffle system is not detected by the diagnosis.

It is a disadvantage, however, that, when this voltage drop occurs, the microprocessor does not continue to be supplied with energy and is thus unable to operate. The safety function therefore has a higher execution priority than the diagnostic function, which cannot be conducted during the emergency function.

DE 44 29 401 C2 discloses a pressure medium-operated actuating drive with a pneumatic control stage based on the principle of an I/P converter. A switch element is provided in the electrical drive path between an electronic circuit and the control stage. When a malfunction occurs, this switch element cuts off the electrical drive of the control stage, so that this stage can then assume a safety position and the pressure medium-operated actuating drive can be vented. The electronic circuit is supplied over a line carrying 4-20 mA according to the so-called "live zero" principle. That is, the current for venting the actuating drive is not zero but rather 4 mA. As a result, the electronic circuit can still be supplied with energy. The switch is a relay switch. The relay is controlled over a line separate from the 4-20-mA line. This additional line, however, can lead to problems in rooms subject to the danger of explosions. In any case, it represents a considerable extra expense.

An emergency shut-off system with an emergency valve or safety valve is also known from EP 1 161 636 B1. In this system, an electrical circuit is installed between a magnetic valve control unit and an emergency control device. This circuit, which consists of resistors, a capacitor, and a semiconductor component, has an impedance-converting function. The goal of converting the impedance is to adapt the voltage output of the emergency shut-off control to the current input of the digital valve control. In this solution, the devices for diagnosis and for shutting off the actuating element are set up separately. Diagnoses cannot be conducted during the execution of the emergency function in this case either.

SUMMARY OF THE INVENTION

The invention is based on the task of creating a position controller of the type and a process for actuating the position controller, this controller making it possible to perform diagnoses under application of the "live zero" principle while also being suitable for use in rooms subject to the danger of explosion. In addition, it should also be possible to conduct a diagnosis, such as the recording of a distance-time diagram of the actuator's movement, even when the current passing through the power line falls below a specified value, i.e., the value at which a pneumatic drive is vented. In addition, the position controller should also be able to operate with extreme reliability. The crucial point is that the connected pneumatic drive will be vented reliably even if the diagnostic unit is malfunctioning. A malfunction is present, for example, when electrical signals which call for the closed position of the actuator are transmitted but the position controller does not vent the pneumatic output because, for example, incorrect signals are being sent from the diagnostic unit to the I/P converter.

The invention eliminates the need for any additional lines to drive the switch which is provided to control the pneumatic drive by way of the I/P converter. This is favorable in cases where the system is used in rooms at risk of explosion and also with respect to the retrofitting of preexisting systems. The open position and the closed position of the actuator are obtained preferably by the use of a 4-20-mA power supply. Thus, the existing current or voltage supply makes it possible to conduct diagnoses even if the pneumatic drive is vented or a valve is in the closed position.

The presence of the additional circuit according to the invention ensures the reliable venting of the pneumatic drive and the necessary disconnection of the I/P converter, especially in cases where the system is driven by 4 mA. This circuit consists preferably of electronic components of high reliability, especially of a resistor and a diode. The additional circuit monitors the input current of the position controller, and an output of the additional circuit acts on the switch connected to the input of the I/P converter. When, for example, the voltage or the current is above a specified value, such as 8 mA, the I/P converter is driven in particular by a data-processing unit, which comprises the functionality of a position controller plus that of a diagnostic unit. When the current falls below the specified value, the additional circuit and the switch cut off the current to the input of the I/P converter. That is, the absence of current (zero) drives the converter in such a way that the output of the position controller vents the pneumatic drive. Simultaneously, however, a microprocessor installed in the data-processing unit, for example, and in particular a distance sensor, continues to receive energy, so that in such a case it is still possible to acquire diagnostic data.

In an advantageous elaboration of the inventive position controller, a diagnostic unit is connected to the power line to acquire diagnostic data on the actuating system. The diagnostic unit allows tests pertaining to the closing and opening movements of the actuator. The diagnostic data can be determined in particular by the position controller installed on site on the actuator. It is even possible for diagnostic data to be acquired at the moment the system is shut down by the valve.

It is advantageous for the data processing unit to be connected to the switch. The switch itself is connected between the data processing unit and the I/P converter. As a result, the position controller can replace a magnetic valve, and the actuator can be set up for test purposes and made to travel over only 10% of its full stroke (the partial-stroke test) in such a way that it can be tested without interfering with the course of the main process. Because safety valves are used only rarely, it is important to test their functionality at regular intervals, so that when a serious incident occurs, it is certain that the emergency valves will function properly.

The data processing unit serves preferably to record a distance-time diagram of the movement of the actuator and/or variables derived from such a diagram, especially a travel time of the valve, a lag time, a T63, or a T96 variable. Such recordings are used to prove that a valve is functional.

Another preferred measure is characterized in that a timer is used, which briefly closes the switch at intervals, so that the data processing unit will drive the I/P converter and diagnose the actuator. As a result, the diagnoses are conducted automatically at the desired intervals.

For the detection of distances, it is advisable to provide the data processing unit with, or to connect it to, a distance sensor, which can detect the movement of an actuating element, preferably via a valve rod. The distance sensor can be designed as an inductive sensor or as an electromechanical sensor.

In safety-oriented fields, it is especially important that the I/P converter be able to move the valve over a limited actuating distance, especially approximately 10% of the total distance, so that this distance can be detected and the actuator tested without interrupting the operation of the plant.

The additional circuit will function with great reliability especially when the circuit which monitors the current consists of a resistor and a diode and when it is installed in the power line.

A live-zero principle in which the position controller is supplied with 4-20 mA, where 20 mA is assigned to the closed position of the switch and 4 mA to an open position of the switch, has proven to give good results. When the current is above a specified value, e.g., 8 mA, the I/P converter is driven by the data processing unit.

According to the invention, it is ensured in particular that the connected pneumatic drive is vented even if the diagnostic device is malfunctioning. In the event of a malfunction, venting is guaranteed by hardware components which are classified according to DIN EN 50020:2002 as not susceptible to breakdown, e.g., a resistor and/or a simple diode, which means that no use is made of software-programmed sequential control or of sequential control programmed by semiconductor functions.

The diagnosis is also conducted in particular when the actuator is called upon to perform the closing function. The diagnosis tests the functionality of the actuator and also that of the I/P converter.

Additional advantages, features, and possible applications of the present invention can be derived from the following description in conjunction with the exemplary embodiment illustrated in the drawing.

The invention is to be described in greater detail below on the basis of the exemplary embodiment shown in the drawing. The terms and assigned reference numbers given in the attached list of reference numbers are used in the description, in the claims, in the abstract, and in the drawing.

DESCRIPTION OF THE INVENTION

Figure 1:
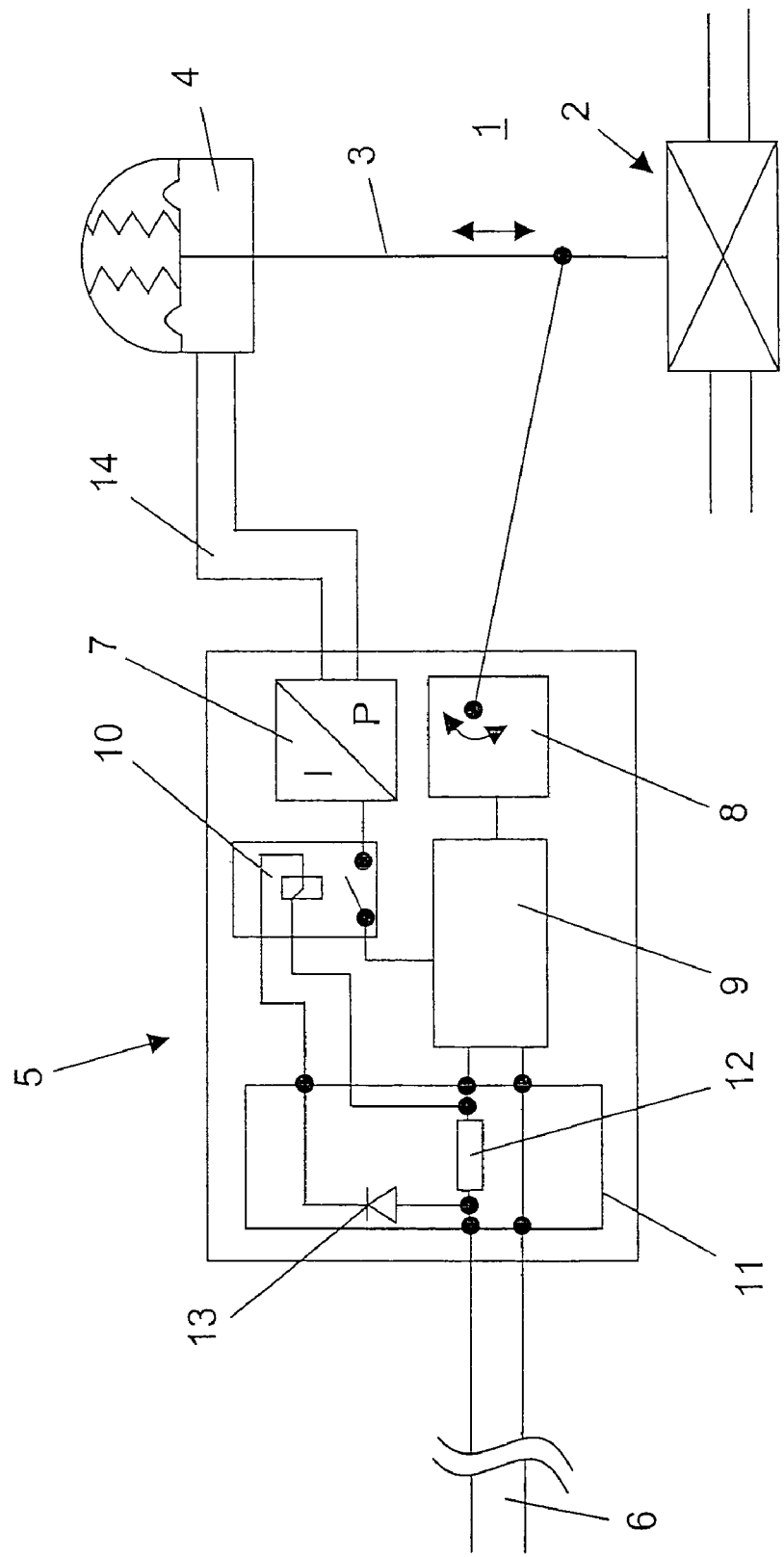
FIG. 1 shows a schematic diagram of a preferred embodiment of an inventive position controller.

An actuator 1 for actuating a safety valve 2 or emergency valve equipped with an actuating element comprises a pneumatic actuating drive 4 with spring return and a valve rod 3, which is connected to the actuating element. The pneumatic actuating drive 4 is connected to a pneumatic output 14 of an inventive position controller 5.

The position controller 5 comprises an I/P converter 7, a distance sensor 8, a data processing unit 9, a switch 10, and, as proposed by the invention, an additional circuit 11.

The I/P converter 7 is connected on the electrical side to the switch 10, and the switch 10 is connected on the other side to the data processing unit 9, so that, when the switch 10 is open, the I/P converter 7 is without current. When the switch 10 is closed, the data processing unit 9 can send a signal via the I/P converter 7 to close the actuating drive 4 only partially for test purposes. But when the switch 10 is open, this diagnostic function is rendered nonfunctional in an emergency or when the safety valve is to be closed 100%.

The distance sensor 8 is connected to the valve rod 3 and delivers a signal to the data processing unit 9 so that, for example, a distance-time diagram can be recorded or a travel time, a lag time, or a T63 or T96 variable can be determined.

The diagnostic unit or data processing unit 9 comprises a microprocessor and one or more memories, e.g., RAM and ROM. The unit is supplied with energy over a connection, especially a two-wire connection or power line, according to the live-zero principle. This is based on the fact that the position controller is supplied with 4-20 mA.

According to the invention, the switch 10 is designed to be driven by an additional circuit, which is connected to the power line 6 and is installed in the position controller 5 and which monitors the current in the power line 6. The switch 10 is preferably a relay. Alternatively, a semiconductor switch, an optocoupler, or a solid-state relay can be used.

In the simplest case, the additional circuit 11 consists of a series resistor 12, installed in the line 6, and a diode 13. The characteristic [i.e., the voltage-current characteristic] of the diode is designed to release the switch 10 as soon as the current arriving over the power line 6 exceeds a threshold value of, for example, 8 mA. When a current of 20 mA is present in the line 6, a very high voltage is present at the resistor 12, in which case the diode becomes fully conductive and the switch 10 is closed. The I/P converter 7 is thus now connected to the data processing unit 9 and can change the pressure on the pneumatic actuating drive 4 for the purpose of diagnosing the valve 2. If the current falls to 4 mA, as it would do during an emergency, the voltage at the diode is no longer sufficient. The diode becomes nonconductive, and the switch 10 opens. The current in the I/P converter 7 becomes zero, and the actuating drive 4 is vented. The actuating drive 4 is preferably spring-loaded and thus closes the safety valve 2.

The special feature of the additional circuit 11 is that it ensures the energy supply to the data processing unit 9 without an additional line and at the same time makes it possible for diagnoses to be made even in an emergency (valve in closed position) and thus, for example, for a distance-time diagram to be recorded. Nevertheless, the actuating drive 4 will always be vented reliably, even if the data processing unit 9 malfunctions. A malfunction of the data processing unit 9 could, for example, take the form of a false signal to the I/P converter.

Alternatively, the additional circuit 11 or the additional module can also be a hardware component or a software module in the microcomputer.

The additional module 11—electrical device 11—is designed in such a way, for example, that it filters out the shut-off signal from the digital protocol by the simplest, certifiable means and thus initiates it in correspondence with the activation of the IP module—I/P converter 7. In this regard, a "shut-off for safety reasons" is possible even if the protocol is not forthcoming.

The surprising discovery was made that, with the arrangement described above, the complete pneumatic section of the position controller 5 is included in the test and the associated diagnosis. On the basis of the recorded parameters, the quality status of the I/P converter 7 can be determined satisfactorily from the movement behavior of the actuator 1 during the course of the test. This offers a considerable advantage over other methods or add-on components, in which the pneumatic unit used to perform the diagnosis is separate from the pneumatic unit used to operate the emergency function. In this case, a defect in the pneumatic unit for the emergency function cannot be detected by the diagnostic function.

The embodiment described here offers the advantage that a diagnosis is possible precisely for and during the times when the closing function is requested and not only during times of nonactuation.

In a modification of the design or method described above, the movement of the actuating element can be controlled by the input signal. For example, the execution of a stroke of the actuating element from 100% to 90% for diagnostic purposes is signalized by a lowering of the signal from 20 mA to 18.4 mA. In this case, the position controller 5 would be designed very simply, merely so that the output signal for the pneumatic output 14 will follow the input signal on the power supply line 6. The diagnostic unit 9 would then record the distance signals only passively and report them back suitably to the higher-level control unit.

The position controller therefore provides improved protection against explosions and also makes it possible to conduct a diagnosis even when the I/P converter is disconnected.

LIST OF REFERENCE NUMBERS 1 actuator
2 safety valve
3 valve rod
4 pneumatic actuating drive
5 position controller
6 power line
7 I/P converter
8 distance sensor
9 data processing unit
10 switch
11 additional circuit
12 series resistor
13 diode
14 pneumatic output

The invention claimed is:

1. Position controller (5) in combination with a valve (2) actuating system wherein said position controller (5) is connected by a pneumatic line to a pneumatic actuator (1) of said valve, comprising:
an I/P converter (7);
an electric power line (6) in electrical communication with said position controller (5);
said I/P converter controlling said pneumatic actuator and said valve (2);
a switch device (10), said switch device includes a contact portion having switch contacts, said switch device includes an actuation portion, a data processing unit (9), said switch interposed between said data processing unit (9) and said I/P converter (7);
said electric power line (6) and said data processing unit (9) control said I/P converter according to the live-zero principle;
said power line (6) includes an electrical current therein;
an additional circuit (11) monitors said current in said power line (6); and,
said additional circuit (11) controls and actuates said actuation portion of said switch device (10) and opens said switch contacts when said current falls below a threshold current.

2. Position controller (5) in combination with a valve (2) actuating system wherein said position controller (5) is connected by a pneumatic line to a pneumatic actuator (1) of said valve, comprising:
an I/P converter (7);
an electric power line (6) in electrical communication with said position controller (5);
said I/P converter controlling said pneumatic actuator and said valve (2);
a switch device (10), said switch device includes a contact portion having switch contacts, said switch device includes an actuation portion, a data processing unit (9), said switch interposed between said data processing unit (9) and said I/P converter (7);
said electric power line (6) and said data processing unit (9) control said UP converter according to the live-zero principle;
said power line (6) includes an electrical voltage;
an additional circuit (11) monitors said voltage in said power line (6); and, said additional circuit (11) controls and actuates said actuation portion of said switch device (10) and opens said switch contacts when said voltage falls below a threshold voltage.

3. Position controller (5) in combination with a valve (2) actuating system, wherein said position controller (5) is connected by a pneumatic line to a pneumatic actuator (1) of said valve according to claim 1, further comprising:
   a pneumatic actuating drive, a distance sensor and a valve rod;
   said valve rod being movable and mechanically linked to said distance sensor (8);
   said valve rod affixed to said valve (2) and said pneumatic actuating drive;
   said data processing unit (9) communicating with said power line (6), said data processing unit in communication with said switch (10), and said data processing unit in communication with said distance sensor;
   said switch being in electrical communication with said I/P converter (7); and,
   said data processing unit acquiring diagnostic data and recording a distance-time diagram of the actuation of said actuator and/or records the travel time or lag time of said valve.

4. Position controller (5) in combination with a valve (2) actuating system, wherein said position controller (5) is connected by a pneumatic line to a pneumatic actuator (1) of said valve according to claim 2, further comprising:
   a pneumatic actuating drive, a distance sensor and a valve rod;
   said valve rod being movable and mechanically linked to said distance sensor (8);
   said valve rod affixed to said valve (2) and said pneumatic actuating drive;
   said data processing unit (9) in electrical communication with said power line (6), said data processing unit in electrical communication with said switch (10), and said data processing unit in communication with said distance sensor;
   said switch being in electrical communication with said I/P converter (7); and,
   said data processing unit acquiring diagnostic data and recording a distance-time diagram of the actuation of said actuator and/or records the travel time or lag time of said valve.

5. Position controller (5) in combination with a valve (2) actuating system, wherein said position controller (5) is connected by a pneumatic line to a pneumatic actuator (1) of said valve, as claimed in claim 1 wherein said I/P converter (7) moves said valve over a limited actuating distance of approximately 10% so that said valve can be tested.

6. Position controller (5) in combination with a valve (2) actuating system, wherein said position controller (5) is connected by a pneumatic line to a pneumatic actuator (1) of said valve, as claimed in claim 2 wherein said I/P converter (7) moves said valve over a limited actuating distance of approximately 10% so that said valve can be tested.

7. Position controller (5) in combination with a valve (2) actuating system, wherein said position controller (5) is connected by a pneumatic line to a pneumatic actuator (1) of said valve, as claimed in claim 1 wherein said additional circuit which monitors said current includes a resistor (12) and a diode (13) in electrical communication with said power line (6).

8. Position controller (5) in combination with a valve (2) actuating system, wherein said position controller (5) is connected by a pneumatic line to a pneumatic actuator (1) of said valve, as claimed in claim 2 wherein said additional circuit which monitors said voltage includes a resistor (12) and a diode (13) in electrical communication with said power line (6).

9. Position controller (5) in combination with a valve (2) actuating system, wherein said position controller (5) is connected by a pneumatic line to a pneumatic actuator (1) of said valve, according to claim 1 wherein said position controller (5) is supplied with 4-20 mA signal, where 20 mA causes said contacts of said contact portion of said switch device (10) to close and 4 mA causes said contacts of said contact portion of said switch device (10) to open.

10. Position controller (5) in combination with a valve (2) actuating system, wherein said position controller (5) is connected by a pneumatic line to a pneumatic actuator (1) of said valve, according to claim 2 wherein said position controller (5) is supplied with 4-20 mA signal, where 20 mA causes said contacts of said contact portion of said switch device (10) to close and 4 mA causes said contacts of said contact portion of said switch device (10) to open.

11. Position controller (5) in combination with a valve (2) actuating system, wherein said position controller (5) is connected by a pneumatic line to a pneumatic actuator (1) of said valve, according to claim 1 further comprising: a connection to a field bus system with digital signal transmission; and, where the transfer of the nominal value for the position of said valve (2) is by means of digital commands.

12. Position controller (5) in combination with a valve (2) actuating system, wherein said position controller (5) is connected by a pneumatic line to a pneumatic actuator (1) of said valve, according to claim 2 further comprising: a connection to a field bus system with digital signal transmission; and, where the transfer of the nominal value for the position of said valve (2) is by means of digital commands.

13. Position controller (5) in combination with a valve (2) actuating system, wherein said position controller (5) is connected by a pneumatic line to a pneumatic actuator (1) of said valve, according to claim 1 wherein said actuator (1) includes a pneumatic drive (4) with a spring which closes said valve when said contacts of said contact portion of said switch device (10) are open and said pneumatic drive (4) is vented.

14. Position controller (5) in combination with a valve (2) actuating system of said valve, wherein said position controller (5) is connected by a pneumatic line to a pneumatic actuator (1), according to claim 2 wherein said actuator (1) includes a pneumatic drive (4) with a spring which closes said valve when said contacts of said contact portion of said switch device (10) are open and said pneumatic drive (4) is vented.

15. Position controller (5) in combination with a valve (2) actuating system, wherein said position controller (5) is connected by a pneumatic line to a pneumatic actuator (1) of said valve, according to claim 1 wherein said switch device (10) is selected from the group of a relay, a semiconductor switch, an optocoupler, or a solid-state relay.

16. Position controller (5) in combination with a valve (2) actuating system, wherein said position controller (5) is connected by a pneumatic line to a pneumatic actuator (1) of said valve, according to claim 2 wherein said switch device (10) is selected from the group of a relay, a semiconductor switch, an optocoupler, or a solid-state relay.

17. Position controller (5) in combination with a valve (2) actuating system, wherein said position controller (5) is connected by a pneumatic line to a pneumatic actuator (1) of said valve, comprising:
   an I/P converter;

an incoming electrical control signal, said incoming electrical control signal is an incoming current signal applied to said position controller;

a data processing unit, said data processing unit generating a data processing unit current signal;

a switch device;

said switch device is selected from the group of a relay, a semiconductor switch, an optocoupler, or a solid-state relay;

said switch device includes an actuation portion and contacts;

said actuation portion of said switch device opens and closes said contacts of said switch device;

said contacts of said switch device are interposed between said data processing unit and said I/P converter, said contacts communicating said data processing unit current signal to said I/P converter when said contacts of said switch are closed;

a control circuit, said control circuit actuates said actuation portion of said switch and moves said contacts of said switch device between closed and open positions;

said control circuit includes:
 a diode in series with said actuation portion of said switch device, and,
 a resistor;

said incoming current signal passes through said control circuit;

upon generation of a sufficiently high voltage across said resistor, said incoming current signal being split into a first switch device actuating current signal which passes through said diode and said actuation portion of said switch device and a second current signal which passes through said resistor;

a sufficiently high voltage across said resistor is generated when said incoming current signal passing through said resistor is sufficiently high to forward bias said diode and conduct said first switch device actuating current through said diode and through said actuation portion of said switch device closing said contacts of said switch device while said second current signal simultaneously passes through said resistor;

said contacts of said switch device opening when said second current signal passing through said resistor generates an insufficiently high voltage across said resistor; and, said first switch device actuating current signal and said second current signal being summed together reconstituting said incoming current signal.

18. Position controller (5) in combination with a valve (2) actuating system, wherein said position controller (5) is connected by a pneumatic line to a pneumatic actuator (1) of said valve, as claimed in claim 17, wherein said data processing unit is also a diagnostic unit, said data processing unit powered by said incoming electrical control signal, said data processing unit diagnosing said actuator even when said contacts of said switch device are open, and, said incoming electrical control signal providing energy to operate said data processing unit.

19. Method for diagnosing an actuator of a valve using a position controller, said position controller (5) is connected to said actuator of said valve, comprising the steps of:

driving and moving said actuator with said position controller;

supplying an electric signal to a data processing unit, said electric signal being a first current signal in the range of 4 to 20 mA, said data processing unit generating a second current signal;

controlling, using said second current signal of said data processing unit, an I/P converter (7);

interposing an electrically controlled switch device (10), said switch device includes switch contacts movable between closed position and open position, between said data processing unit and said I/P converter;

controlling said switch device (10) with an additional circuit (11) connected to said first current signal, said switch device (10) includes a first current operating point between 4 to 20 mA wherein: said switch contacts are closed above said first current signal operating point enabling electrical communication of said second current signal of said data processing unit from said data processing unit to said I/P converter; and, said switch contacts are open when said first current signal is below said first current signal operating point disabling electrical communication of said second current signal of said data processing unit from said data processing unit to said I/P converter;

driving, using said second current signal of said data processing unit, said I/P converter and monitoring said position of said actuator to determine the operational status of said valve when said first current signal is above said first current signal operating point; and, venting said actuator when said data processing unit is malfunctioning and said first current signal is below said first current signal operating point.

20. Method according to claim 19 wherein said data processing unit includes a diagnostic unit and said data processing unit drives said I/P converter to open and close said actuator.

21. Method according to claim 19 wherein functionality of said actuator (1) and said I/P converter (7) is tested by monitoring said position of said actuator with a distance sensor to determine operational status of said valve.

22. Method according to claim 19 wherein said step of venting said actuator is ensured by use of a high reliability resistor and a high reliability diode.

23. Position controller (5) in combination with a valve (2) actuating system, wherein said position controller (5) is connected by a pneumatic line to a pneumatic actuator (1) of said valve, as claimed in claim 17, wherein said data processing unit current signal follows said incoming current signal.

24. Position controller (5) in combination with a valve (2) actuating system, wherein said position controller (5) is connected by a pneumatic line to a pneumatic actuator (1) of said valve, as claimed in claim 17, wherein said data processing unit current signal is independent of said incoming current signal and is used for testing of said pneumatic actuator and said valve.

25. Method for diagnosing an actuator of a valve using a position controller, said position controller (5) is connected to said actuator of said valve, as claimed in claim 19 wherein second current signal of said data processing unit follows said first current signal.

26. Method for diagnosing an actuator of a valve using a position controller, said position controller (5) is connected to said actuator of said valve, as claimed in claim 19 wherein second current signal of said data processing unit is independent of said first current signal and is used for testing said pneumatic actuator and said valve.

* * * * *

UNITED STATES PATENT AND TRADEMARK OFFICE
CERTIFICATE OF CORRECTION

PATENT NO. : 7,862,003 B2  
APPLICATION NO. : 11/435926  
DATED : January 4, 2011  
INVENTOR(S) : Thomas Karte and Joerg Kiesbauer It is certified that error appears in the above-identified patent and that said Letters Patent is hereby corrected as shown below:

In Claim 2, Col. 6, line 63, after "said" delete "UP" and insert --I/P--.

Signed and Sealed this  
Twenty-second Day of February, 2011

David J. Kappos  
*Director of the United States Patent and Trademark Office*